United States Patent Office 2,766,414
Patented Oct. 9, 1956

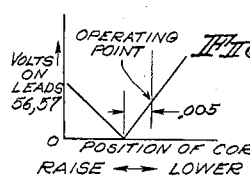

2,766,414

CONTOUR SENSING APPARATUS

Marvin E. Jessey, Los Angeles, and Carroll A. Bartsch, Altadena, Calif.

Application February 9, 1952, Serial No. 270,874

6 Claims. (Cl. 318—32)

The present invention relates to improved control apparatus and, while described herein in relationship to the contour machining of metal surfaces, the present apparatus is capable of performing other uses, particularly when it is desired to position an element in accordance with variation in position of a second element; and, more specifically, the present invention relates to an improved system wherein it is desired to have one element follow the movement of a pilot element without substantial sluggishness and without overshooting its ultimate position.

An object of the present invention is to provide an improved system of this character wherein an element is caused to follow the movement of a second element without sluggishness and without overshoot.

Another object of the present invention is to provide an improved circuit, using high frequency current, for adjusting the position of a milling machine bed or table with respect to a cutter in accordance with the movement of a pilot element over the contour of a profile of predetermined shape whereby metal may be machined or contoured in substantially exact conformity with such profile.

Another object of the present invention is to provide an improved follow-up system using high frequency currents, to produce a differential effect in accordance with the deviation of one element with respect to the other, such differential effect being used to control the position of a second element in accordance with the position of said one element.

Another object of the present invention is to provide an improved follow-up system in which an element is moved to different positions in the process of maintaining a control element in a balanced condition, such control element constituting an element of a high frequency circuit in an electromagnetic servo loop.

Another object of the present invention is to provide improved means and techniques whereby the contours of liquid flow nozzles may be duplicated quickly, inexpensively and accurately.

The features of the present invention which are believed to be novel are set forth with particularity in the appended claims. This invention itself, both as to its organization and manner of operation, together with further objects and advantages thereof, may be best understood by reference to the following description taken in connection with the accompanying drawings in which:

Figure 1 shows an electromagnetic servo loop embodying factors of the present invention.

Figure 2 is a graphic representation serving to illustrate the adjustment and operating range of the apparatus shown in Figure 1.

Figure 3 shows a modified form of the present invention.

The arrangement shown in Figure 1 is described herein as functioning automatically to position, without sluggishness and without overshoot, the height of a milling machine bed or table 10 in relationship to the stationary axis of rotation of the milling machine cutter 11 so that the work 12 is machined or contoured to have substantially the exact contour of the specimen 13 which is mounted on the same bed or table 10. Vertical movement of the table 10, as indicated by the arrows 14, is controlled by a pilot follower shoe 15 contacting and following the contour of the pilot specimen 13 while the table 10 is being slowly moved to the left, as indicated by the arrow 16, by means which form conventional components of a standard milling machine and which for that reason are not illustrated here.

While the table 10 is being moved to the left, the table 10 is automatically moved up and down, as the case may be, by the means described hereinafter, such that the follower shoe 15 always engages the upper surface of the specimen 13. The apparatus functions so that the follower shoe 15 tends to remain stationary while the table 10 is being automatically moved up or down, as the case may be, to obtain the contact between the follower shoe 15 and the specimen 13. The follower shoe 15 has attached thereto the magnetic core 17 which tends to seek a mean balanced position, and upon deviation from such mean position an unbalance is effected, such unbalance serving to raise or lower the table 10 in such a direction as to restore the magnetic core to such mean balanced position. The magnetic core 17 extends through two outside coils 18, 19, and the center coil 20. The coils 18, 19 are serially connected in bucking relationship to transfer an unbalanced voltage to the control grid of control tube 23. The center coil 20 is connected to receive an output voltage from tube 24 which is coupled to the high frequency generator or oscillator stage 30.

The coils 18, 19 and 20 are thus in a high frequency circuit which is supplied with currents having a frequency in the order of 100 kc. developed in the oscillator stage 30.

The oscillator stage 30 includes the tube 31 and frequency determining crystal 32 which is connected between the control grid of tube 31 and to the cathode of tube 31 through the serially connected lamp bulbs 34, 35, tending to maintain the amplitude of the high frequency generated at a substantially constant level. Resistance 36 is connected in parallel with the crystal 32. The anode of tube 31 is connected to the positive terminal of voltage source 37 through the coil 38, high frequency choke coil 39 and voltage dropping resistance 40. The coil 38 is tuned to the resonant frequency by condenser 41 which is connected in parallel therewith.

The high frequency voltage appearing at the junction point of coils 38, 39 is coupled through condenser 44 to the control grid of tube 45. One terminal of resistance 36 is grounded so that a high frequency voltage appears on the control grid of tube 45, such control grid being returned to ground through resistance 47 and the cathode of tube 45 being likewise returned to ground through resistance 48. The anode of tube 45 is connected to the positive terminal of voltage source 37 for the flow of space current through a serial circuit which includes the transformer primary coil 49 and voltage dropping resistance 50. The high frequency voltage developed in the cathode circuit of tube 45, i. e., across the potentiometer resistance 48, is applied through the adjustable tap on resistance 48 and condenser 51 to the control grid of tube 24, such control grid being returned to ground through resistance 53. Tube 24 is a cathode follower tube and has its anode connected directly to the positive terminal of source 37 while its cathode is returned to ground through resistance 54. The voltage thus developed on the cathode of tube 24 is transferred through the coupling condenser 55 and resistance 55A to one terminal of the center coil 20, the other terminal of coil 20 being grounded. The resistance 55A and condenser 55, serve generally as impedance matching components. By this means, a substantially constant voltage is applied to the terminals of coil 20; and in the balanced position of the coil assembly 18, 19, 20, substantially equal and opposite voltages are developed in the serially connected outside coils 18, 19 so that in such balanced condition a relatively small voltage appears between the two leads 56, 57. It is this voltage across leads 56, 57 which is automatically maintained at a substantially constant value, i. e., the value indicated at the operating point shown in Figure 2. Any deviation from this voltage corresponding to the balanced condition causes the table 10 to be moved up or down, as the case may be, to effect a restoration of such voltage to its mean balanced value represented by such operating point.

It is noted, from the circuit thus far described, that a high frequency voltage appears across the terminals of the primary transformer coil 49, such coil 49 having one of its terminals connected to the anode of tube 45 and the other one of its terminals returned to ground through the bypass condenser 58. The coil 49 is tuned to the resonant frequency by tuning condenser 60 connected in shunt with coil 49. A voltage is thus induced in the closely coupled secondary winding 63 which is tuned by the shunt connected condenser 64, and such voltage thus developed in winding 63 is applied to a series circuit which includes a crystal rectifier 65 and resistance 67 so that a rectified voltage in the order of 70 volts appears across the resistance 67. The rectified voltage developed across the resistance 67 is filtered by the filter condenser 68 connected in shunt with resistance 67. Resistance 67 is 2 megohms and condenser 68 is .001 microfarad. One terminal of resistance 67 is connected to terminal 70 through isolating resistance 69, while the other terminal of resistance 67 is connected to the terminal 71. It is noted that both terminals 70, 71 are bypassed to ground through corresponding bypass condensers 72, 73.

The voltage thus developed on resistance 67, as previously described, constitutes a reference voltage of substantially constant magnitude which is constantly compared with a voltage developed as a result of the unbalance in coils 18, 19. This unbalanced voltage is referred to herein as the measured voltage to differentiate from the reference voltage. The unbalanced voltage developed in coils 18, 19 and appearing on leads 56, 57 is applied to the control grid of the pentode tube 23 serving the purpose of a voltage amplifier. It is noted that lead 56 is grounded and lead 57 is connected directly to the control grid of tube 23. The cathode of tube 23 is connected to ground through resistance 74 which has connected in shunt therewith the bypass condenser 75. The screen grid of tube 23 is connected to the positive terminal of voltage source 37 through two serially connected resistances 76, 77, such screen grid being bypassed to ground for high frequencies by bypass condenser 78. The anode of tube 23 is connected to the positive terminal of source 37 through the coil 79, resistance 80 and resistance 77, such coil 79 being tuned to the resonant frequency by the tuning condenser 81.

The high frequency voltage thus developed on the anode of the voltage amplifier tube 23 is coupled through coupling condenser 82 to the control grid of tube 84 constituting a power amplifier. The tube 84 has its cathode connected to ground through resistance 85 and has its control grid also returned to ground through resistance 86. The screen grid of tube 84 is connected to a point on the voltage dividing circuit which includes the serially connected resistances 87, 88, 92, such screen being bypassed to ground through condenser 94. The anode of tube 84 is connected through primary transformer winding 89 and resistance 88 to the positive terminal of source 37, such primary winding 89 being tuned to the resonant frequency by the shunt connected tuning condenser 90.

Thus, by these means, a relatively high radio frequency voltage is developed in the secondary transformer winding 95 which is tuned by the shunt connected tuning condenser 96, and such voltage is rectified by rectifier 98 and appears across resistance 99. Such rectified voltage is filtered by condenser 100. One terminal of resistance 99 is connected to terminal 71 and the other terminal of resistance 99 is connected through resistance 102 to the terminal 70.

By these means, the reference voltage developed using the circuitry including resistance 67 is compared with the measured rectified voltage developed across resistance 99. It is clear that only voltages of continuous nature appear across the resistances 67, 99 and it is these voltages, which are used to elevate or lower the milling machine or table 10, as the case may be.

For this general purpose, it is noted that the continuous voltage on terminal 70 is stabilized at a predetermined level since such terminal is connected to an adjustable point on a voltage dividing circuit 140, 139, 141 and 142.

It is observed that the sensitivity of the arrangement is determined essentially by the voltage developed on resistance 67, the higher this voltage, within limits, the higher the sensitivity. This means an increased amplification is required of the voltage developed on lead 56, 51, and, the smaller becomes the change in voltage developed in the sensing unit.

The reference voltage developed on the upper terminal of resistance 67 is applied through isolating resistance 103 to the control grid of tube 105 which has its cathode connected to a bus 106 upon which appears a regulated voltage in the order of 105 volts, such regulated voltage being obtained, using the serially connected regulator tube 107 and resistance 108, one terminal of regulator tube 107 being grounded and the junction point of tube 107 and resistance 108 being connected to the bus 106. The upper end of resistance 108 is connected to the positive terminal of voltage source 37.

The anode of tube 105 is connected through resistance 109 to the positive terminal of source 37. The screen grid of tube 105 is connected directly to the positive terminal of source 37. The anode of tube 105 is conductively coupled to the control grid of tube 110 through resistance 111 which is connected in shunt with condenser 112. The control grid of tube 110 is returned to ground through resistance 114. The cathode of tube 110 is connected to the voltage regulated bus 106. The screen grid of tubes 110 and 105 are interconnected, and the anode of tube 110 is connected to the positive terminal of source 37 through serially connected relay winding 115 and resistance 116. A condenser 117 is connected in shunt with resistance 116 and relay winding 115. A neon indicating lamp 120 has one of its terminals connected to the anode of tube 110 and the other one of its terminals connected through resistance 122 to the positive terminal of source 37 for indicating the energized condition of winding 115.

The tubes 123 and 124 are connected in the same manner as tubes 105 and 110 for purposes of obtaining a control effect in accordance with variations in measured voltage. For this purpose, the upper terminal of resistance 99 is connected through resistance 125 to the control grid of tube 123. It is noted that the series circuit provided by resistances 125 and 99 is shunted by condenser 126. This condenser is considered important in that it provides damping in the servo loop and also prevents hunting. For this purpose, the resistance 125 is 1 megohm, the resistance 99 is 2 megohms, and the condenser 126 is .01 microfarads.

The cathode of tube 123 is connected to the common voltage regulated bus 106, so as to minimize the number of power supplies and to render the operation of one trigger tube dependent to a certain degree on the operation of the other trigger tube, i. e., when for example, the tube 124 conducts the voltage regulating circuit being, of course, imperfect causes a slightly increased voltage to be developed across the regulator tube 107 to help lock out the trigger tube 105. The screen grids of tubes 123 and 124 are both connected to the positive terminal of source 37. The anode of tube 123 is connected to the positive source of tube 37 through resistance 127 and such anode is conductively connected through resistance 128 to the control grid of tube 124. Condenser 130 shunts resistance 128. The control grid of tube 124 is connected through resistance 131 to an adjustable tap on resistance 132, one terminal of resistance 132 being grounded while the other terminal of resistance 132 is connected to the common voltage regulated bus 106. The anode of tube 124 is connected through relay winding 133 and resistance 134 to the positive terminal of source 37. A condenser 135 bypasses the serially connected elements 133, 134. A neon indicating lamp 120A has one of its terminals connected to the anode of tube 124 and the other one of its terminals connected through resistance 138 to the positive terminal of source 37 for indicating the energized condition of winding 133.

The voltage at terminal 70 is stabilized by connecting the same to an adjustable tap on resistance 139, such resistance 139 constituting an element of a voltage dividing network including resistance 140, resistance 139, adjustable resistance 141, and fixed resistance 142. The resistance 139 is 5,000 ohms and constitutes a fine adjustment, while the resistance 141 is 25,000 ohms and constitutes a coarse adjustment.

Only one of the relay windings 115, 133 is energized at any one particular instant. The relay windings 115, 133 serve generally to energize the direct current motor 143 for rotation in either one of two directions, depending upon which of the two windings 115, 133 is energized. When neither of these two windings is energized, the motor 143 is likewise de-energized and the motor shaft 144 stands still. It is noted that the motor shaft 144 carries a worm 145 in mesh with the cooperating element 147 serving to raise or lower the table 10, depending upon the direction which the motor shaft rotates. The relay switches 115A, 133A associated with windings 115 and 133 serve essentially as combination energizing and reversing switches. The switch 115A comprises a single-pole double-throw switch, one stationary contact of switch 115A being connected to one terminal of relay winding 148, the other stationary contact of switch 115A being connected to the movable contact of switch 133A. The movable contact of switch 115A is connected to one terminal of the remotely located normally open switch 149. The other terminal of such normally open switch 149 is connected to the lower stationary contact of switch 115A. The stationary contact of switch 133A is connected on the one hand to one terminal of relay winding 150 and on the other hand, to one terminal of the normally open switch 151, the other terminal of switch 151 being connected to the negative terminal of source 152. Relay windings 148 and 150 each have a terminal thereof connected to the positive terminal of the continuous voltage source 152, the negative terminal of such source being connected to the movable contact of relay switches 148A and 150A. The stationary contacts of switches 148A and 150A are connected to different leads of the reversible motor 143. By these means, energization of winding 115 causes energization of winding 148 and rotation of the motor 143 in one direction; and energization of winding 133 causes energization of winding 150 and rotation of the motor 143 in the opposite direction. Similarly, manual closure of switch 149 results in rotation of the motor in such one direction; and closure of switch 151 results in rotation of the motor in the opposite direction.

It is observed that the control element 15 has a mean position represented by the operating point designated as such on the curve in Figure 2, which appears self-explanatory. The apparatus functions to restore the control element to such mean position by raising or lowering the bed or table 10 as required. For this purpose, the apparatus is sensitive to a differential effect, i. e., a difference in voltage existing across resistances 67 and 99 which are connected in a serial circuit with a third resistance 69 and a fourth resistance 102. A current flows in such serial circuit of such polarity and of such intensity as determined by the rectified voltages developed on resistances 67 and 99. It is observed that the junction point of resistances 69 and 102 is connected to an adjustable point on a voltage dividing network so that the operating point of control tubes 105, 123 are simultaneously controlled.

While the control, as described above, serves to fully energize the reversible motor for travel in opposite directions, it is noted that a voltage is developed in the circuit allowing a step control, i. e., the motor 143 may be caused to travel in either direction at different speeds. For this purpose, the modified arrangement shown in Figure 3 is provided wherein a series resistance 205 is in the motor leads for controlling the speed of the motor in corresponding opposite directions. This resistance 205 is connected in parallel with the normally open relay switch 210A which is associated with the relay winding 210, such relay winding 210 being sensitive to and operated by relatively large unbalanced voltages and for that purpose is connected to be responsive to the current flowing in the loop circuit including resistances 67, 69, 102 and 99, either by connecting such winding 210 as a current relay in such circuit, or by connecting such coil in a circuit responsive to the voltage drop across either resistance 69 or 102.

As mentioned previously, the coils 18, 19 and 18, 20 are relatively stationary and for that purpose are mounted on a common supporting member or frame 200, the frame 200 however being adjustable with respect to the core member 17 to which is attached the follower 15. For that purpose the supporting member or frame 200 has affixed thereto an arm 201 carrying a threaded sleeve 202 through which a rotatable adjusting screw 203 is threaded. This screw 203 is free to rotate but is prevented from moving axially due to engagement of the stationary recessed roller 204 engaging the annular flange 203A on the screw 203. The screw 203 is provided with a knurled knob 203B.

It is clear, from the structure described above, that turning of the screw 203 results in vertical, up or down movement of the coils 18, 19 and 18, 20 as a unit relative to the core member 17. The core member 17 is free to move downwardly under the influence of gravity forces acting thereon; and, if desired, a string may be added to supplement the action of the gravity forces on the core member 17. Also, it is understood, that stops may be provided, cooperating with the core member 17, to limit its up or down movement.

It is noted that the screw 203 provides a micrometer adjustment whereby the depth of the cut made by the milling machine cutter 11 is regulated, and, for that purpose, suitable indicia, such as a dial and pointer arrangement may, in conventional manner, be associated with the screw 203 for purposes of allowing one to accurately position the screw 203.

It is noted that the core member 17 is attached to the follower 15 which is provided with a roller 15A for engaging the standard pattern 13 and that the diameter of such roller 15A is substantially the same as the diameter of the milling machine cutter 11.

It is observed, with reference to Figure 2, that while operation is about the operating point as designated in Figure 2, the apparatus is capable of operating about a second operating point which has the same ordinate as the operating point shown, but which has a different abscissa.

Initially, in the setup, the pattern or standard 13 and work 12, are clamped to the table 10, which is in a lowered position with the roller 15A out of engagement with the standard 13. Thereafter the table 10 is raised to an extent where the first operating point is reached, with operating point designated as such in Figure 2.

It is noted that further raising of the table 10 causes a lowering of the voltage on leads 56, 57 to a zero value and then to an increasing positive value until the second operating point is reached. Operation may be about either one of such operating points, but it is preferred to use the first operating point reached when the table is raised, so as to avoid confusion.

In the operation described above, it is observed that the control tubes 105, 123 are each normally conducting, thereby placing a relatively low voltage on the control grids of corresponding tubes 110, 124 to render the same non-conducting, or semi-conducting in an amount insufficient to operate the relay switches 115A, 133A respectively. The tubes 110, 124 are rendered sufficiently conductive only when the corresponding control tubes 105, 123 pass a relatively small amount of current.

The D. C. reversible motor 143 is conventional in that it incorporates a clutch which is normally disengaged and a brake which is normally engaged, whereby the output shaft of the motor, in the absence of voltage applied to the motor, is locked in a stationary position. Application of 24 volts to the motor results, substantially simultaneously in engagement of the clutch, disengagement of the brake, and energization of the motor armature and motor field, to cause the motor output shaft to rotate. Under these conditions, it is desirable to superimpose, or inject, a control voltage in the system as described, having a frequency in the order of 10 cycles per second, the exact frequency depending upon the maximum rate at which the motor clutch could be energized and de-energized. This control voltage, may be injected in the system by, for example, coupling the same to the control grid of tube 45; or, in the alternative, tube 45 may be replaced by a tetrode, i. e., a tube having two grid structures with one of such grids being connected to the junction point of resistance 47 with condenser 44, and the other grid structure being connected to such source of alternating voltage having a frequency in the order of 10 cycles per second.

We claim:

1. In an arrangement of the character described, a source of high frequency, a control element tending to remain in a mean position, means including a first resistance for deriving a continuous voltage representative of the magnitude of said source, means including a second resistance for deriving a second continuous voltage representative of the position of said control element, one terminal of each of said resistances being connected together, a third and fourth resistances serially connected between the other terminals of said first and second resistances, a continuous voltage dividing network, the junction point of said third and fourth resistances being connected to an adjustable point on said voltage dividing network, a second movable element for moving said control element, means sensitive to a voltage developed across said first resistance for moving said second movable element in one direction, and means sensitive to the voltage developed across said second resistance for moving said second control element in a direction opposite to said first direction.

2. The arrangement set forth in claim 1 in which a condenser means is connected in shunt with each of said first and second resistances.

3. In an arrangement of the character described, a source of high frequency, a control element tending to remain in a mean position, means including a first resistance for deriving a continuous voltage representative of the magnitude of said source, means including a second resistance for deriving a second continuous voltage representative of the position of said control element, one terminal of each of said resistances being connected together, a third and fourth resistances serially connected between the other terminals of said first and second resistances, a continuous voltage dividing network, the junction point of said third and fourth resistances being connected to an adjustable point on said voltage dividing network, a second movable element for moving said control element, means sensitive to a voltage developed across said first resistance for moving said second movable element in one direction, and means sensitive to the voltage developed across said second resistance for moving said second control element in a direction opposite to said first direction, condenser means connected in shunt with each of said first and second resistances, a fifth resistance, said fifth resistance having one of its terminals connected to the junction point of said second and fourth resistances and having its other terminal connected to a control grid of a tube for moving said second control element in said opposite direction, and condenser means connected in shunt with both said second and fifth resistances.

4. In an arrangement of the character described, a member movable both in a horizontal driection and in a vertical direction, means for moving said member in a vertical direction, a movable element tending to remain in a stationary mean position for engaging work on said member, said movable element being connected to a magnetic core, a coil structure including three coils, each of said coils cooperating magnetically with said core, a high frequency source connected to one of said coils, the other two coils being connected in bucking relationship to develop a differential voltage, with the magnitude of said differential voltage being representative of the position of said movable element, means deriving a second voltage representative of the voltage of said source, means sensitive to the difference between said differential voltage and said second voltage for operating said first means to restore said movable element to said mean position.

5. The arrangement set forth in claim 4, in which means are provided for adjusting said coil structure with respect to said movable core, said means comprising a stationary support, a micrometer screw rotatably mounted in said support but being prevented from moving axially with respect to said support, and means moving said coil structure with respect to said core upon turning of said micrometer screw.

6. In apparatus of the character described, a movable element tending to remain in a mean position, a source of high frequency currents, means deriving a reference voltage representative of the voltage of said source, means including said high frequency source for deriving a second voltage representative of the position of said movable element, apparatus for restoring said movable element to said mean position, and means sensitive to the difference between said first and second voltages for operating said apparatus, said means deriving a reference voltage representative of the voltage of said source comprising rectifying means for deriving a unidirectional voltage from said source of high frequency currents, and said means for deriving a second voltage representative of a position of said movable element comprising rectifying means for producing a unidirectional voltage derived from said source of high frequency currents.

References Cited in the file of this patent

UNITED STATES PATENTS

| | | |
|---|---|---|
| 1,998,939 | Mittag | Apr. 23, 1935 |
| 2,112,682 | Ryder | Mar. 29, 1938 |
| 2,116,593 | Bouvier et al. | May 10, 1938 |
| 2,351,626 | Muller | June 20, 1944 |
| 2,376,405 | Turchan et al. | May 22, 1945 |
| 2,434,854 | Junkins et al. | Jan. 20, 1948 |

(Other references on following page)

| | | | | | |
|---|---|---|---|---|---|
| 2,511,956 | Wetzel | June 20, 1950 | 2,593,339 | Ostermann et al. | Apr. 15, 1952 |
| 2,529,111 | Steinberger | Nov. 7, 1950 | 2,602,660 | Shannon | July 8, 1952 |
| 2,535,250 | Allen | Dec. 26, 1950 | 2,607,989 | Peterson et al. | Aug. 26, 1952 |
| 2,546,657 | Smout | Mar. 27, 1951 | 2,627,055 | Calosi | Jan. 27, 1953 |
| 2,559,575 | Fryklund et al. | July 3, 1951 | 2,630,008 | Howe et al. | Mar. 3, 1953 |
| 2,568,586 | Hunt et al. | Sept. 18, 1951 | 2,695,981 | Smoot | Nov. 30, 1954 |
| 2,584,004 | Enslein | Jan. 29, 1952 | | | |